United States Patent
Healy et al.

(10) Patent No.: US 7,153,036 B2
(45) Date of Patent: Dec. 26, 2006

(54) OPTICAL FIBER CONNECTOR

(75) Inventors: David Healy, Stowmarket (GB); Martyn Owen, Diss (GB); Paul Wilton, Ipswich (GB)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 267 days.

(21) Appl. No.: 10/732,663

(22) Filed: Dec. 10, 2003

(65) Prior Publication Data
US 2004/0146252 A1    Jul. 29, 2004

(30) Foreign Application Priority Data
Jan. 29, 2003    (GB) ................ 0302052.6

(51) Int. Cl.
*G02B 6/36*    (2006.01)
(52) U.S. Cl. .............. 385/78; 385/53; 385/76; 385/77
(58) Field of Classification Search .......... 385/53, 385/76, 77, 78
See application file for complete search history.

(56) References Cited

U.S. PATENT DOCUMENTS

| | | | |
|---|---|---|---|
| 5,315,680 A * | 5/1994 | Musk et al. ........... 385/88 |
| 5,647,042 A | 7/1997 | Ochiai et al. ............ 385/56 |
| 5,774,611 A * | 6/1998 | Nagase et al. ........... 385/58 |
| 6,283,644 B1 | 9/2001 | Gilliland et al. ......... 385/93 |
| 6,804,436 B1 * | 10/2004 | Healy ..................... 385/33 |

FOREIGN PATENT DOCUMENTS

WO    WO 98/34146    6/1998

OTHER PUBLICATIONS

GB Search Report, Application Number GB 0302052.6, dated Mar. 27, 2003.

* cited by examiner

*Primary Examiner*—Jennifer Doan

(57) ABSTRACT

The present invention relates to an optical fiber communication component (1), and particularly a connector receptacle (10) for connecting to a connector plug (20) having an optical fiber (6) mounted within a projecting cylindrical ferrule. The connector receptacle (10) comprises a housing (2) that has a passageway (3) with an entrance for receiving the ferrule (7). A split sleeve clamp (27) is seated within the passageway (3) and has an opening oriented towards the entrance for receiving the projecting ferrule (7). A hollow sleeve (23) having a cylindrical outer surface (36) and an axially extending open channel (37), is gripped by the split sleeve clamp to define the diameter of the opening to the clamp. The open channel (37) extends along the longitudinal axis (5) of the passageway (3) to allow optical radiation (50) to be transmitted through the channel (37) to/from said connector plug (20).

18 Claims, 4 Drawing Sheets

OPTICAL FIBER CONNECTOR

FIELD OF THE INVENTION

The present invention relates to an optical fibre communication component, and particularly a connector receptacle for connecting to a connector plug having an optical fibre mounted within a cylindrical ferrule.

DISCUSSION OF THE BACKGROUND ART

Optical communication components, such as optical fibre transmitters and/or receivers, generally referred to hereinafter as optical transceivers, often need to be connected to other such components or optical fibre transmission cables. For example, an optical transceiver may have a connector port into which connector patch cord is plugged.

One common type of optical fibre connector, disclosed in U.S. Pat. No. 5,315,680, has an optical port inside of which is a hollow cylindrical split sleeve. The split sleeve is ceramic and has a longitudinal slot and is inwardly sprung so that this clamps over a ceramic ferrule within the port. The ferrule is cylindrical and normally has a diameter of 1.25 mm. An optical fibre is mounted concentrically within the ferrule to form a ferrule fibre assembly. The optical fibre may be a fibre stub that is optically connected to one or more other passive of active optical components, for example a solid state laser or detector device as part of an optical transceiver unit. The split sleeve extends forwards of the ferrule, and forms with a surrounding body a connector receptacle into which a connector plug can be inserted.

The connector plug has a cylindrical ceramic ferrule with a concentrically mounted optical fibre. This ferrule is manufactured to the same dimensions and tolerances as the ferrule/fibre assembly within the connector receptacle. The connector plug includes a body portion, with a forwards part of the ferrule/fibre assembly projecting freely from this body portion so that when the connector plug mates with the connector receptacle, the projecting portion of the connector plug fibre/ferrule assembly inserts into the forwards extending portion of the split sleeve.

In addition to providing a convenient means for butt-aligning optical fibres, this arrangement provides several advantages. Because both ferrule/fibre assemblies are manufactured to the same tolerance, the fibres are naturally aligned with respect to each other during the connection process to within a sub-micron accuracy. The extending split ferrule and surrounding body portion also provide an effective optical baffle when no connector plug is connected to the connector receptacle by aperturing stray optical radiation. Furthermore, because the output end of the fibre is recessed within the connector receptacle, the arrangement protects the output end of the fibre from mechanical damage as well as preventing a user's eye from coming closer than a minimum safety from the output end of the fibre. The latter issue is of particular concern as the wavelength of the optical radiation is normally either 1.31 µm or 1.55 µm, and is therefore invisible to the human eye.

Although the arrangement described above works effectively, there is a significant amount of cost in manufacturing the various components of the connector receptacle, particularly the ferrule/fibre assembly, which must be formed with an outer diameter toleranced to ±0.5 µm, so that the fibres are axially aligned to within ±1 µm.

SUMMARY OF THE INVENTION

It is therefore an object of the present invention to provide a more economical optical fibre connector, and particularly a connector receptacle for connecting to a connector plug having an optical fibre mounted within a cylindrical ferrule.

According to a first aspect of the invention, there is provided an optical fibre connector receptacle for connecting to a connector plug having an optical fibre mounted within a projecting cylindrical ferrule, the connector receptacle comprising a housing, a passageway through the housing, the passageway extending along a longitudinal axis between a first entrance for receiving said projecting ferrule and a second entrance, and a clamp seated within the passageway, the clamp extending along the longitudinal axis and presenting radially around the longitudinal axis one or more radially inwards directed clamping surfaces, a first portion of said clamping surface(s) defining an opening to the clamp oriented towards the first entrance and being free for receiving said projecting cylindrical ferrule and a second portion of said clamping surface(s) towards the second entrance, wherein:

the connector receptacle comprises a hollow sleeve having a cylindrical outer surface and an axially extending open channel;

the second portion of said clamping surface(s) of the seated clamp grips the sleeve outer surface and thereby defines the diameter of the first portion of said clamping surface(s); and the open channel extends along the longitudinal axis of the passageway to allow optical radiation to be transmitted through the channel to/from said connector plug.

The clamp may be a split sleeve and is preferably radially inwardly spring-biased, so that the clamp naturally grips the sleeve and preferably also the projecting ferrule.

In one embodiment of the invention, the hollow sleeve extends longitudinally between a first end and a second end and the hollow sleeve is fully open at both ends of the sleeve.

In another embodiment of the invention, the sleeve extends longitudinally between a first end and a second end and the hollow sleeve includes at least one optical element which is transparent to optical radiation transmitted through the channel. The element may be a window for example in order to provide sealing or protection against dust or moisture ingress, or sealing, or a lens for example to focus optical radiation passing through the channel. The optical element may be mounted at the end of the sleeve nearest the transceiver device.

According to a second aspect of the invention, there is provided an optical fibre connector assembly comprising an optical fibre connector receptacle and a connector plug, the connector receptacle being according to the first aspect of the invention, and the connector plug having an optical fibre mounted within a projecting cylindrical ferrule, the projecting cylindrical ferrule being gripped by the first portion of said clamping surface(s) of the seated clamp when the connector receptacle is joined to the connector plug so that the optical fibre is aligned relative to the longitudinal axis of the passageway.

Preferably, both the projecting ferrule and the hollow sleeve are both formed from a ceramic material.

According to a third aspect of the invention, there is provided an optical communication component, comprising an optical fibre connector assembly, a focussing element and an optical transceiver device, in which the connector assembly is according to the second aspect of the invention, and the focussing element is arranged to focus optical radiation through the channel between the optical fibre and the transceiver device.

The focussing element may be any type of focussing element, for example a lens, a mirror or a holographic element.

According to a fourth aspect of the invention, there is provided a method of connecting an optical fibre connector receptacle with a connector plug, the connector plug having an optical fibre mounted within a projecting cylindrical ferrule, the connector receptacle comprising a housing, a passageway through the housing, and seated in the passageway a clamp, the clamp extending along the longitudinal axis and presenting radially around the longitudinal axis one or more radially inwards directed clamping surfaces, the method comprising the steps of:

(a) inserting a hollow sleeve into a second portion of the clamp in order to define an inner diameter of a first portion of the clamp, the hollow sleeve having an open channel that extends along the longitudinal axis of the passageway; and (b) inserting the projecting ferrule into the first portion of the clamp so that the clamp grips the projecting ferrule and the optical fibre is aligned axially with the channel.

According to a fifth aspect of the invention, there is provided a method of using an optical communication component to send and/or receive optical radiation, the communication component comprising an optical fibre connector receptacle with a connector plug, a focussing element and an optical transceiver device, the connector plug having an optical fibre mounted within a projecting cylindrical ferrule, the connector receptacle comprising a housing, a passageway through the housing, and seated in the passageway a clamp, the clamp extending along the longitudinal axis and presenting radially around the longitudinal axis one or more radially inwards directed clamping surfaces, the method comprising the steps of:

(a) inserting a hollow sleeve into a second portion of the clamp in order to define an inner diameter of a first portion of the clamp, the hollow sleeve having an open channel that extends along the longitudinal axis of the passageway;

(b) inserting the projecting ferrule into the first portion of the clamp so that the clamp grips the projecting ferrule and the optical fibre is aligned axially with the channel; and (c) using the focussing element to focus optical radiation through the channel between the optical fibre and the transceiver device.

BRIEF DESCRIPTION OF THE DRAWINGS

The invention will now be further described, by way of example only, and with reference to the accompanying drawings, in which.

DETAILED DESCRIPTION OF THE PREFERRED EMBODIMENT

Figure 1:
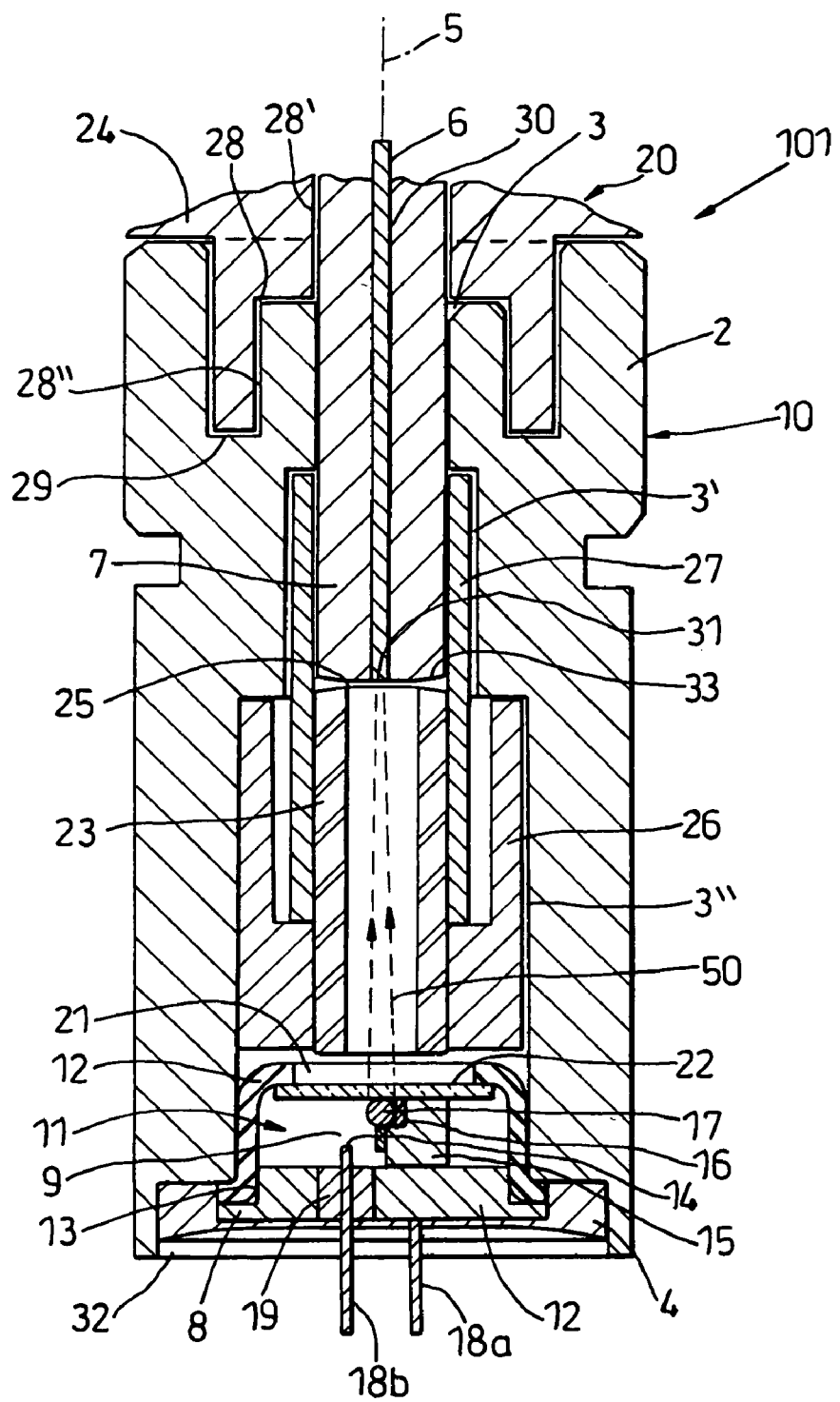
FIG. 1 is a cross-sectional view of an optical fibre connector assembly according to a first embodiment of the invention, comprising an optical fibre connector receptacle and a connector plug.

FIG. 1 shows an optical fibre connector assembly 101, formed from an optical fibre connector receptacle 10 and a connector plug 20. Both the connector receptacle 10 and connector plug 20 are, for the most part, cylindrically symmetric about a longitudinal axis 5, which lies in the plane of the drawings.

The connector receptacle 10 has an outer housing 2, which is formed with a passageway in the form of a multiply-stepped axial bore 3. At one end 32 of the bore 3 is mounted an optical transceiver device, here a transmitter device 8. The transmitter device 8 is secured to the housing 2 by organic adhesive 4, which also provides some backfill to the associated open end 32 of the housing 2.

The transmitter device 8 comprises a base plate 12 (also referred to as a "header"), which together with a metal can 13 forms a sealed enclosure 11 housing an infra-red laser diode 14 mounted on a heat sink 15. The laser preferably operates at either 1.31 µm or 1.55 µm. Also mounted on the heat sink 15 is a monitor photodiode 16, and on the monitor diode 16 a spherical lens 17 which collimates and focuses the light output of the laser 14. The lens 17 also serves to scatter light from the laser 14 into the monitoring photodiode 16.

Electrical connections to the laser are via pins 18*a* and 18*b* of which pin 18*a* is electrically connected to the header 12 and provides electrical connection to the laser diode 14 by way of the heat sink 15. The other electrical connection is by way of pin 18*b*, which passes through an insulating seal 19 into the interior of the enclosure 11 and is electrically connected via a bond wire 9.

The can 13 has in its top wall 12 an aperture 21. The aperture is sealed by window 22, which is transparent to the radiation output of the laser diode 14.

Other arrangements of light source and lenses may, of course, be used instead, such as arrangements employing graded index (GRIN) lenses.

The axial bore 3 is open at the end opposite the transmitter 8 to provide a receptacle for the connector plug 20, only a forward end of which is illustrated in the drawings. The connector plug 20 has a housing 24 with a stepped axial bore 28, an outer portion of which 28" locates with a matching cylindrical recess 29 in the connector plug housing 2. The precise external shape of the two housings 2,24 and any alignment surfaces will, of course, be determined by the need for matching whichever type of optical fibre connector is employed.

An inner portion 28' of the plug housing 24 holds a cylindrical ferrule 7, held in place with adhesive (not illustrated). The plug ferrule 7 has an axial channel 30, which holds an optical fibre 6, bonded in place with an adhesive (not illustrated). The plug ferrule 7 is made from a ceramic material and projects axially from the plug housing 24. A fibre end 31 is flush with a domed annular end 33 of the plug ferrule 7. In order to achieve good optical coupling into the optical fibre 6, the bonded fibre end 31 and the annular end 33 of the plug ferrule 7 are together polished to sub-micron smoothness.

The plug ferrule 7 will typically be about 1.25 mm to 3 mm in diameter, with the ferrule channel 30 being about 125 µm in diameter. The optical fibre 6 may be a single mode optical fibre, having a central core (not illustrated) about 8.5 µm in diameter surrounded by index guiding cladding (not illustrated).

Figure 2:
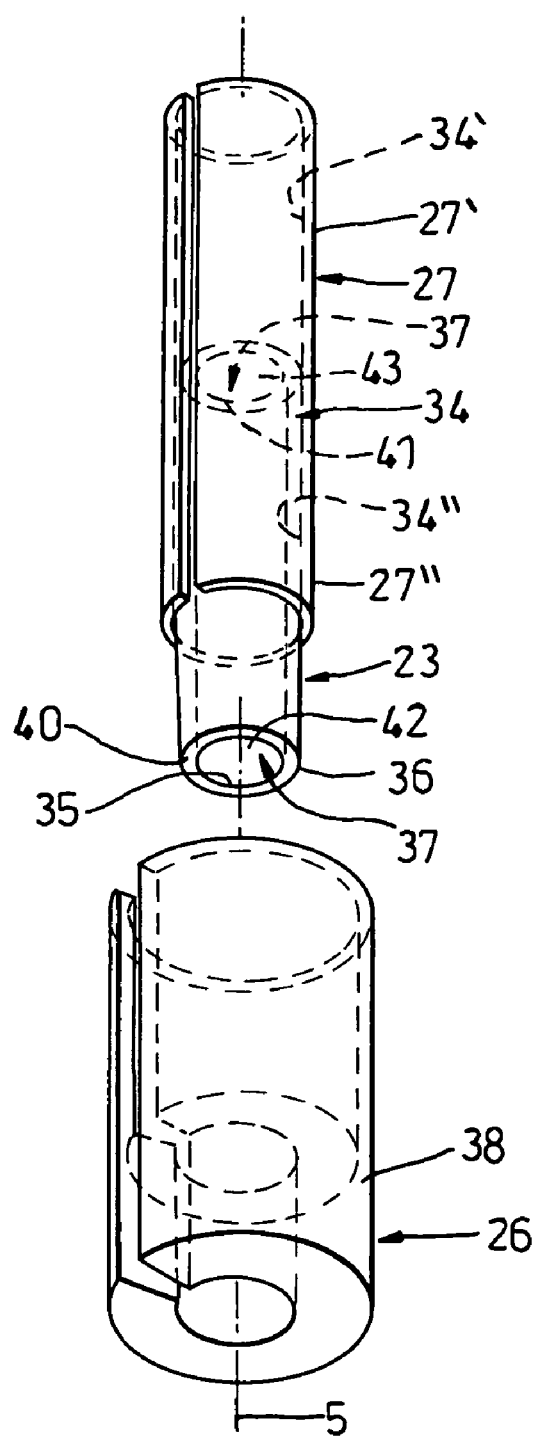
FIG. 2 is a perspective exploded view of some of the internal components of the connector plug of FIG. 1.

Reference is now made also to FIG. 2. The connector receptacle 10 has a hollow sleeve 23 having cylindrical inner and outer surfaces 35,36 both of which are concentric with the longitudinal axis 5 of the assembly 101. An open channel 37 therefore extends axially through the hollow sleeve 23 between opposite annular ends 40,41 that surround corresponding circular openings 42,43. The hollow sleeve 23 is preferably formed from the same ceramic material and in a similar fashion to that for the plug ferrule 7, so that both the plug ferrule 7 and the hollow sleeve 23 have the same outer diameter.

The connector receptacle 10 also has a clamp 27 that extends along the longitudinal axis 5 and which presents radially around the longitudinal axis 5 an inwardly directed clamping surface 34. In this example, the clamp is in the form of a cylindrical split sleeve 27, but other forms of clamp having one or more radial clamping surfaces may equivalently be used.

As shown in FIGS. 1 and 2, the split sleeve 27 has a free first portion 27' for receiving the projecting plug ferrule 7. A hollow sleeve 23 is partially seated within a second portion 27" of the split sleeve 27, leaving a first portion 34' of the clamping surface 34 free to receive the plug ferrule 7 when the connector plug 20 is joined with the connector receptacle 10.

The split sleeve 27 may be made from a resiliently deformable metal, for example brass, but is preferably made from the same ceramic material as the hollow sleeve 23 and the plug ferrule 7, in order to balance coefficients of thermal expansion. Such ceramic materials are stiffer than metals, but will still be resiliently deformable.

Prior to insertion of the hollow sleeve 23 into the free first portion 27' of the split sleeve 27, the split-sleeve 27 has a natural inner diameter slightly less than that of the hollow sleeve 23, so that when the hollow sleeve 23 is partially inserted, a second portion 34" of the clamping surface 34 is inwardly spring-biased to securely clamp the hollow sleeve 23. This also has the effect of setting the inner diameter of the first portion 34' of the clamping surface 34, so that this may accurately locate the plug ferrule 7 with respect to the split sleeve 27.

The connector receptacle 10 also has a second ceramic or metallic split sleeve 26, which serves as a holder for the cylindrical split sleeve 23. The second split sleeve 26 has a cylindrical outer surface 38 that makes a push-fit with the associated part 3" of the stepped bore 3 and, in addition, is secured in place by means of adhesive (not illustrated). In this way, the orientation of the optical fibre 6 with respect to the connector receptacle housing is set when the connection plug 20 is joined to the connector receptacle 10.

The split sleeve 27, therefore centres and lightly clamps the projecting end of the plug ferrule 7, thus aligning and supporting the optical fibre 6 in directions transverse to the longitudinal axis 5. When the connector plug 20 is joined to the connector receptacle 10, the annular end 33 of the plug ferrule 7 preferably comes into abutting contact with the annular end 41 of the hollow sleeve 23, thereby also setting the longitudinal spacing between the transmitter device 8 and the exposed end 31 of the optical fibre 6.

It should be noted that in order to allow a small amount of radical expansion of the split sleeve 27, to accommodate variation in diameter of the plug ferrule 7, the external surface of the split sleeve 27 makes a loose fit within the corresponding section 3' of the axial bore 3.

The open channel 37 through the hollow sleeve 23 then extends along the longitudinal axis 5 of the passageway 3 between the transmitter device 8 and the end 31 of the optical fibre 6. Radiation 50 from the laser diode 14 is coupled via the spherical lens 17 and the window 22 directly into the optical fibre 6.

This arrangement provides several advantages. First, unlike the channel 30 supporting the optical fibre, the open channel 37 of the hollow sleeve 36 does not need to be precisely formed, and is therefore considerably less expensive to manufacture. The open channel 37 only needs to be wide enough to allow optical radiation to pass from the lens 17 to the optical fibre 6. For example, if the hollow sleeve is 1.25 mm in diameter, then the diameter of the open channel 37 may be about 0.8 mm.

Another advantage stems from the fact that the annular ends 40, 41 of the hollow sleeve 36 do not need to be polished to the same degree of accuracy as the projecting annular end 33 of the plug ferrule 7. The annular end 41 of the hollow sleeve 23 is more simply prepared to remove any rough edges and so provide a reliable abutting contact with the domed end 33 of the plug ferrule 7.

The assembled connector receptacle 10 also provides a minimum eye-safety distance when no connector plug 20 is joined to the receptacle 10, owing to the distance between the focus point at which radiation would otherwise be coupled into the optical fibre end 31 and the external opening to the passageway 3. The connector receptacle 10 therefore provides an effective optical baffle.

Finally, there is no contact with the exposed end 33 of the optical fibre 6 when the plug ferrule 7 and hollow sleeve 23 come into contact, thus sparing the optical fibre 6 from any damage or wear.

The length of the hollow sleeve may be between 2 mm and 5 mm. The minimum spot size will depend on this distance, and the effective numerical aperture of the focussing lens 17, but will typically be between about 7 µm and 20 µm in diameter, which is comparable with the diameter of the core of the optical fibre 6. Although the spot size will be larger than with the prior art arrangement using an abutting optical fibre stub, there are inevitable coupling losses with such stubs, and so the overall coupling efficiency of this arrangement is adequate for many applications.

Figure 3:
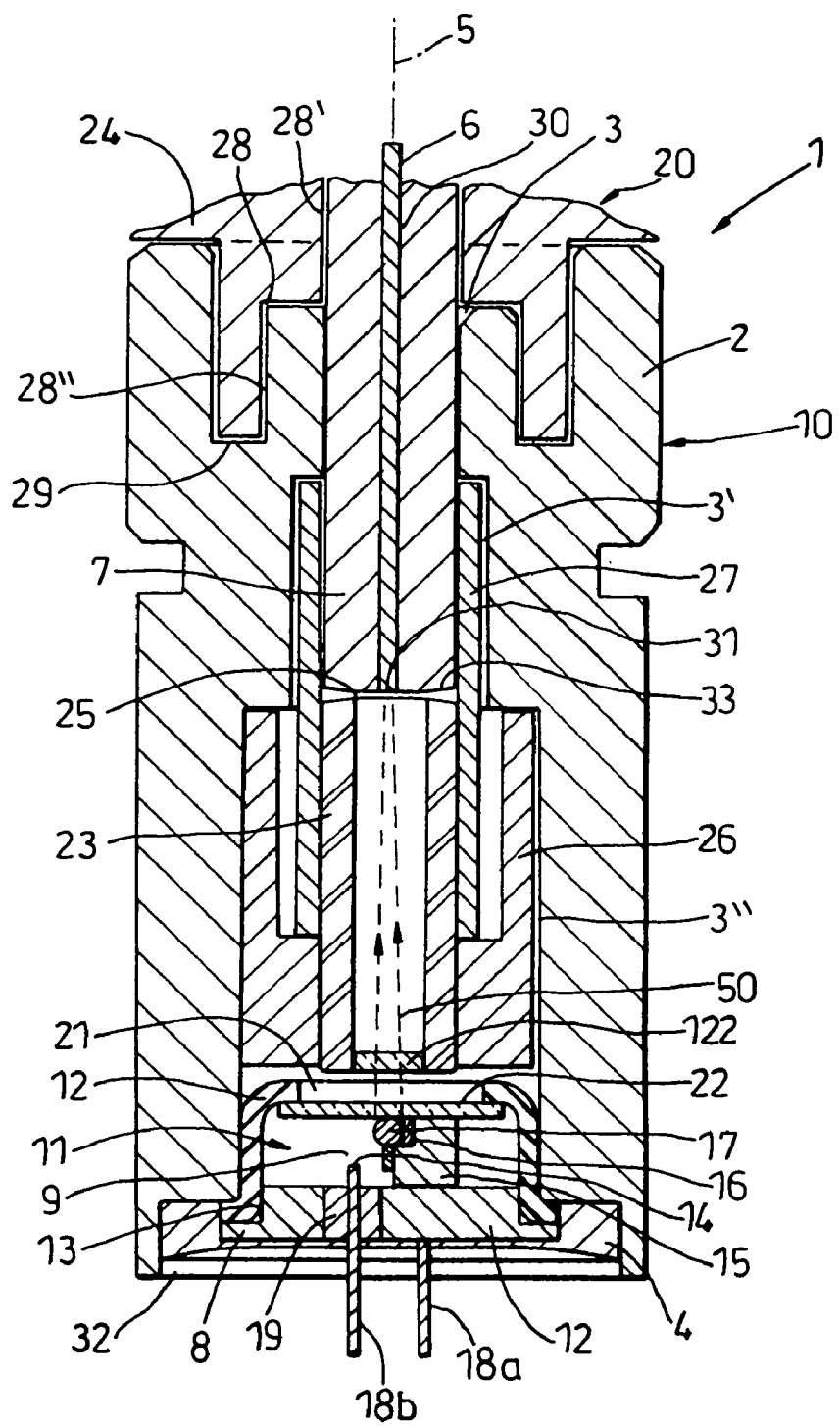
FIG. 3 is a cross-sectional view of an optical fibre connector assembly according to a second embodiment of the invention.

FIG. 3 shows a second embodiment of an optical fibre connector assembly 1, in which components the same as those of the first embodiment 101 are indicated with the same reference numerals. The assembly 1 differs from that of the first embodiment 101 in that the circular opening 42 of the hollow sleeve 23 holds a circular window 122, which may be either tilted or antireflection coated to prevent stray reflections back into the laser diode 14. The advantage of this arrangement is that the window 122 provides protection against dust or moisture ingress into the vicinity of the transmitter device 8.

Figure 4:
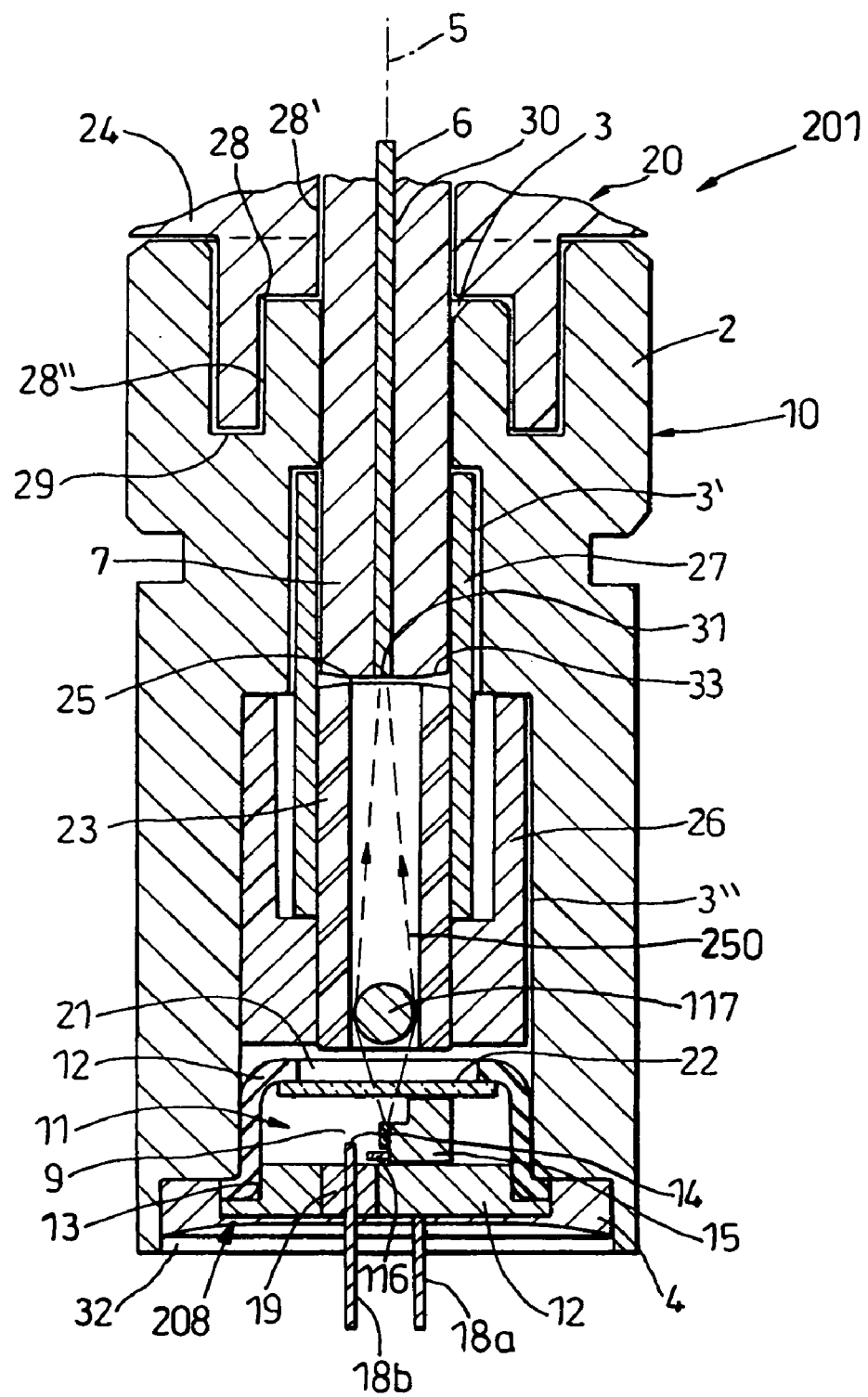
FIG. 4 is a cross-sectional view of an optical fibre connector assembly according to a third embodiment of the invention.

FIG. 4 shows a third embodiment of an optical fibre connector assembly 201, in which components the same as those of the first and second embodiments 101 ,1 are indicated with the same reference numerals. The assembly 201 differs from that of the first embodiment 101 mainly in that the transmitter device 208 does not have a collimating lens 17. Instead, a collimating lens 117 is mounted inside the circular opening 42, and arranged to focus optical radiation 250 onto the free end 31 of the optical fibre 6. The lens 117 may be held in place by an adhesive, for example a uv-curable adhesive (not illustrated).

The transmitter device 208 has a monitor photodiode 116 arranged to collect optical radiation from a back facet of the laser diode 14. An advantage of this arrangement is that the collimating lens 117 is of larger diameter and closer to the end 31 of the optical fibre 6, thereby increasing the numerical aperture of the system, reducing the resulting focus spot and increasing the coupling efficiency between the laser diode 14 and the optical fibre 6. In addition, the lens 117 provides similar protection to that of the circular window 122 described above against dust or moisture ingress into the vicinity of the transmitter device 208.

The invention described above is also applicable to other types of optical communication component, in particular an optical receiver or relay component, having instead of the transmitter device 8 an optical receiver device, such as a photodiode or an optical amplifier. The invention allows economies to be made in the manufacture of a wide range of optical fibre connector receptacles.

The invention claimed is:

1. An optical fibre connector receptacle for connecting to a connector plug having an optical fibre mounted within a projecting cylindrical ferrule, the connector receptacle comprising:
    a housing having a passageway therethrough, said passageway extending along a longitudinal axis, between a first entrance for receiving said projecting ferrule and a second entrance;
    a clamp seated within the passageway, extending along said longitudinal axis and presenting a clamping surface, radially inwards-directed around said longitudinal axis, wherein said clamping surface has (a) a first portion defining an opening to said clamp oriented towards said first entrance and being free for receiving said projecting cylindrical ferrule, and (b) a second portion towards said second entrance; and
    a hollow sleeve having a cylindrical outer surface and an axially-extending open channel that extends along said longitudinal axis to allow optical radiation to be transmitted through said open channel to/from said connector plug,
    wherein said second portion of said clamping surface grips said cylindrical outer surface of said hollow sleeve and thereby defines a diameter of said first portion of said clamping surface.

2. The optical fibre connector receptacle of claim 1, wherein said clamp is radially inwardly spring-biased.

3. The optical fibre connector receptacle of claim 1, wherein said clamp is a split sleeve.

4. The optical fibre connector receptacle of claim 1, wherein said clamp has one radially inward directed clamping surface.

5. The optical fibre connector receptacle of claim 1, wherein said clamp is formed from a resilient material.

6. The optical fibre connector receptacle of claim 1, wherein said hollow sleeve extends longitudinally between a first end and a second end, and the hollow sleeve is fully open at both ends of the sleeve.

7. The optical fibre connector receptacle of claim 1,
    wherein said hollow sleeve extends longitudinally between a first end and a second end,
    wherein said optical fibre connector receptacle further comprises an optical element that is transmissive to said optical radiation, situated at said first end.

8. The optical fibre connector receptacle of claim 7, wherein said optical element is a window.

9. The optical fibre connector receptacle of claim 7, wherein said optical element is a lens.

10. The optical fibre connector receptacle of claim 1, further comprising a focussing element that focuses said optical radiation, through said open channel, between said optical fibre and an optical device.

11. An optical fibre connector assembly comprising:
    a connector plug having an optical fibre mounted within a projecting cylindrical ferrule; and
    an optical fibre connector receptacle having:
        (a) a housing that includes a passageway therethrough, said passageway extending along a longitudinal axis, between a first entrance for receiving said projecting ferrule and a second entrance;
        (b) a clamp seated within the passageway, extending along said longitudinal axis and presenting a clamping surface, radially inwards-directed around said longitudinal axis, wherein said clamping surface has (i) a first portion defining an opening to said clamp oriented towards said first entrance and being free for receiving said projecting cylindrical ferrule, and (ii) a second portion towards said second entrance; and
        (c) a hollow sleeve having a cylindrical outer surface and an axially-extending open channel that extends along said longitudinal axis to allow optical radiation to be transmitted through said open channel to/from said connector plug,
    wherein said second portion of said clamping surface grips said cylindrical outer surface of said hollow sleeve and thereby defines a diameter of said first portion of said clamping surface, and
    wherein said projecting cylindrical ferrule is gripped by said first portion of said clamping surface when said connector receptacle is joined to said connector plug, so that said optical fibre is aligned relative to said longitudinal axis.

12. The optical fibre connector assembly of claim 11, wherein said projecting ferrule and said hollow sleeve are both formed from a ceramic material.

13. The optical fibre connector assembly of claim 11, wherein said projecting ferrule and said hollow sleeve have a same diameter as one another.

14. The optical fibre connector assembly of claim 11, further comprising a focussing element that focuses said optical radiation, through said open channel, between said optical fibre and an optical device.

15. An optical communication component comprising:
    a focussing element;
    an optical transceiver device; and
    an optical fibre connector assembly having:
        (A) a connector plug having an optical fibre mounted within a projecting cylindrical ferrule; and
        (B) an optical fibre connector receptacle having:
            (i) a housing that includes a passageway therethrough, said passageway extending along a longitudinal axis, between a first entrance for receiving said projecting ferrule and a second entrance;
            (ii) a clamp seated within the passageway, extending along said longitudinal axis and presenting a clamping surface, radially inwards-directed around said longitudinal axis, wherein said clamping surface has (1) a first portion defining an opening to said clamp oriented towards said first entrance and being free for receiving said projecting cylindrical ferrule, and (2) a second portion towards said second entrance; and
            (iii) a hollow sleeve having a cylindrical outer surface and an axially-extending open channel that extends along said longitudinal axis to allow optical radiation to be transmitted through said open channel to/from said connector plug,
    wherein said second portion of said clamping surface grips said cylindrical outer surface of said hollow sleeve and thereby defines a diameter of said first portion of said clamping surface, wherein said projecting cylindrical ferrule is gripped by said first portion of said clamping surface when said connector receptacle is joined to said connector plug, so that said optical fibre is aligned relative to said longitudinal axis, and wherein said focussing element focuses said optical radiation, through said open channel, between said optical fibre and said optical transceiver device.

16. A method of connecting an optical fibre connector receptacle to a connector plug, wherein said connector plug has an optical fibre mounted within a projecting cylindrical ferrule, wherein said connector receptacle has a housing with a passageway therethrough, and a clamp seated in said passageway, said clamp extending along a longitudinal axis and presenting a clamping surface, radially inwards-directed around said longitudinal axis, and wherein said method comprises:

(a) inserting a hollow sleeve into a first portion of said clamp to define an inner diameter of a second portion of said clamp, wherein said hollow sleeve has an open channel that extends along said longitudinal axis to allow optical radiation to be transmitted through said open channel to/from said connector plug; and (b) inserting said projecting ferrule into said second portion of said clamp so that said clamp grips said projecting ferrule and said optical fibre is aligned axially with said open channel.

17. The method of claim 16, wherein said connector receptacle further includes a focussing element that focuses said optical radiation, through said open channel, between said optical fibre and an optical device.

18. A method of using an optical communication component to send and/or receive optical radiation, wherein said optical communication component has an optical fibre connector receptacle that connect to a connector plug, a focussing element, and an optical transceiver device, wherein said connector plug has an optical fibre mounted within a projecting cylindrical ferrule, wherein said connector receptacle has a housing with a passageway therethrough, and a clamp seated in said passageway, said clamp extending along a longitudinal axis and presenting a clamping surface, radially inwards-directed around said longitudinal axis, and wherein said method comprises:

(a) inserting a hollow sleeve into a first portion of said clamp to define an inner diameter of a second portion of said clamp, wherein said hollow sleeve has an open channel that extends along said longitudinal axis to allow optical radiation to be transmitted through said open channel to/from said connector plug;

(b) inserting said projecting ferrule into said second portion of said clamp so that said clamp grips said projecting ferrule and said optical fibre is aligned axially with said open channel; and (c) using the focussing element to focus said optical radiation through said open channel between said optical fibre and said transceiver device.

* * * * *

UNITED STATES PATENT AND TRADEMARK OFFICE
CERTIFICATE OF CORRECTION

PATENT NO.        : 7,153,036 B2
APPLICATION NO.   : 10/732663
DATED             : December 26, 2006
INVENTOR(S)       : David Healy et al.

It is certified that error appears in the above-identified patent and that said Letters Patent is hereby corrected as shown below:

On the Title Page, Item [56]: Column 2, (U.S. Patent Documents), Line 4, delete "B1" add insert -- B2 --;

On the Title Page: (Abstract), Lines 1-16, delete "The present invention relates to an optical fiber communication component (1), and particularly a connector receptacle (10) for connecting to a connector plug (20) having an optical fiber (6) mounted within a projecting cylindrical ferrule. The connector receptacle (10) comprises a housing (2) that has a passageway (3) with an entrance for receiving the ferrule (7). A split sleeve clamp (27) is seated within the passageway (3) and has an opening oriented towards the entrance for receiving the projecting ferrule (7). A hollow sleeve (23) having a cylindrical outer surface (36) and an axially extending open channel (37), is gripped by the split sleeve clamp to define the diameter of the opening to the clamp. The open channel (37) extends along the longitudinal axis (5) of the passageway (3) to allow optical radiation (50) to be transmitted through the channel (37) to/from said connector plug (20)."

and insert -- An optical fiber communication component, and particularly a connector receptacle for connecting to a connector plug having an optical fiber mounted within a projecting cylindrical ferrule. The connector receptacle comprises a housing that has a passageway with an entrance for receiving the ferrule. A split sleeve clamp is seated within the passageway and has an opening oriented towards the entrance for receiving the projecting ferrule. A hollow sleeve having a cylindrical outer surface and an axially extending open channel, is gripped by the split sleeve clamp to define the diameter of the opening to the clamp. The open channel extends along the longitudinal axis of the passageway to allow optical radiation to be transmitted through the channel to/from said connector plug. --.

Signed and Sealed this

Nineteenth Day of October, 2010

David J. Kappos
*Director of the United States Patent and Trademark Office*